Dec. 17, 1929.　　J. C. BOHMKER　　1,739,574
GRAIN GRINDER
Filed April 21, 1927
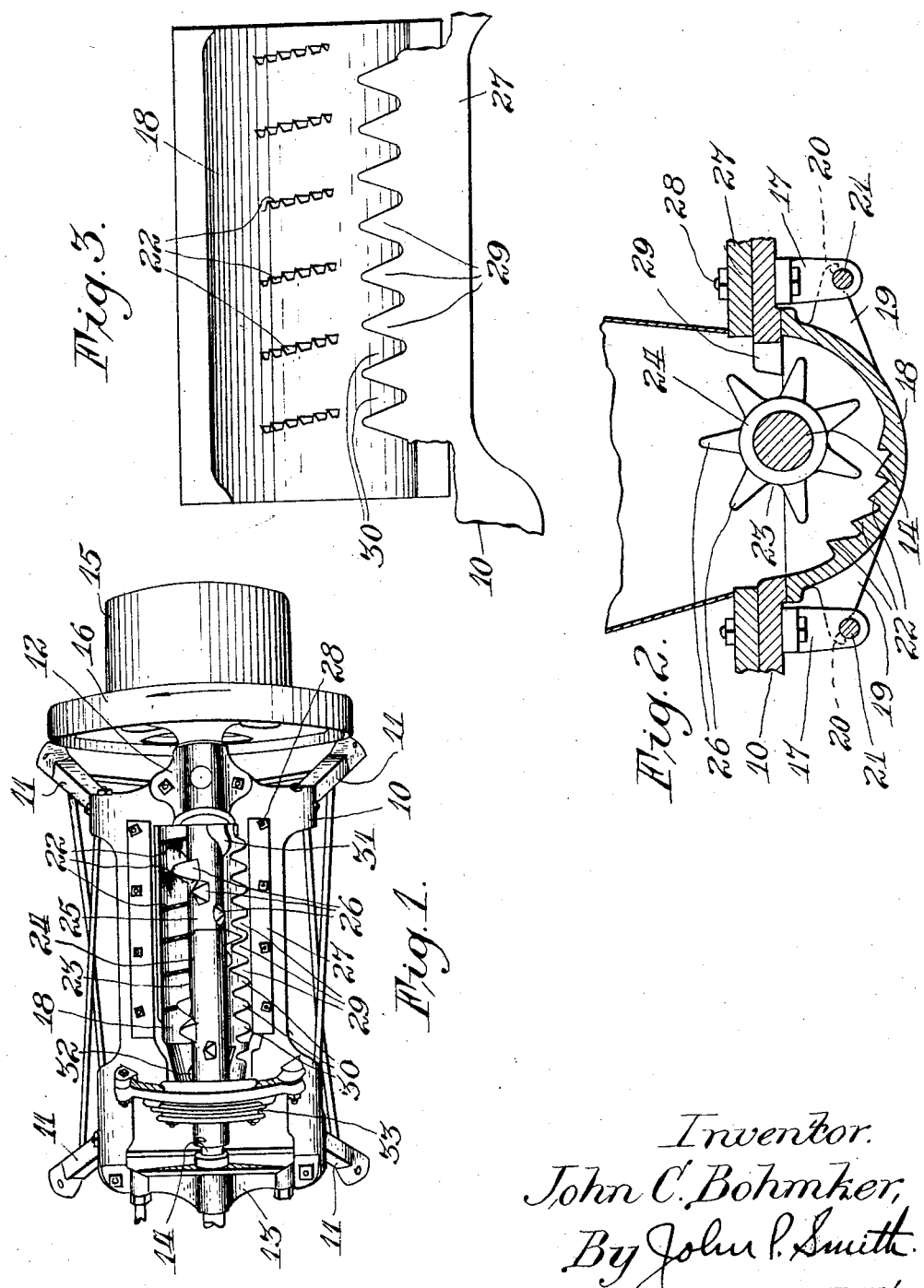
Inventor.
John C. Bohmker,
By John P. Smith.
Atty.

Patented Dec. 17, 1929

1,739,574

UNITED STATES PATENT OFFICE

JOHN C. BOHMKER, OF KANKAKEE, ILLINOIS

GRAIN GRINDER

Application filed April 21, 1927. Serial No. 185,464.

This invention relates to a grinding mill and more particularly to a conveying and breaking mechanism for breaking up the ears of corn in a more efficient manner prior to feeding the same into the grinding mechanism.

One of the objects of the present invention is to provide an improved form of grinding mill which is simple in construction and efficient in operation.

Another object of the present invention is to provide an improved form of conveying mechanism in combination with a novel form of concave in which the teeth are so arranged on the conveyor screw that they are successively brought into co-operative action with the teeth on the concave so that each portion of the ears of corn is successively broken up by successive engagement with the co-operative teeth.

A still further object of the invention is to provide a novel form of grinding mill and a particularly novel mechanism for cutting and breaking up ears of corn in which the teeth on the concave are positioned reversely with respect to the teeth on the conveyor screw.

A still further object of the invention is to provide a breaker bar having a plurality of teeth which co-operate with the teeth on the rotary crusher and conveyor member in such a manner that the material is properly reduced to a fineness which will render it more easily ground by the grinding burrs.

These and other objects are accomplished by providing a construction and an arrangement of the various parts in the manner hereinafter described and particularly pointed out in the appended claims.

Referring to the drawings:

Figure 1 is a top perspective plan view of the conventional form of a grinding mill showing my improvement embodied therein;

Figure 2 is a cross sectional view taken on a transverse plane passing through the conveyor screw in concave; and Figure 3 is a top plan view of the concave.

In the conventional form of grinding machine provided with the usual spiral rib on the conveyor which co-operates with the concave teeth of the grinding machine, considerable difficulty has been experienced in the efficient operation of this type of machine because when the same is used for breaking up ears of corn prior to feeding the smaller particles to the grinding mechanism, the whole ear of corn becomes wedged between the web of the screw and the concave bottom, thus requiring the machine to crush the entire ear at one time. When this occurs, it will readily be seen that an excessive strain is placed on the machine and renders the same inefficient in operation. It is therefore the primary object of my invention to provide a novel and improved form of crushing mechanism which will effectively grip successive portions of the ear of corn by reason of the successive position of the teeth formed on the conveyor and the reversely directed position of the teeth on the concave. It will be noted that this construction evenly distributes the breaking up of the ears of corn by having the co-operative teeth successively engage the ear during the complete cycle of operation of the machine, thereby rendering a smoothly and efficiently operated grinding machine.

In carrying out my invention I have shown the same in connection with the conventional form of grinding machine which consists of a main base frame 10 which is suitably supported on legs 11 secured to the four corners of the main frame. Mounted in the bearings 12 and 13, secured to the opposite ends of the frame is a shaft 14. Secured to the shaft 14 is a pulley 15 and fly wheel 16. Secured to the main or base frame 10 by means of depending leg members 17 is a concave 18 which is provided with four laterally projecting lugs 19 formed integrally therewith. The lugs 19 have their outer ends curved as shown at 20 and are adapted to rest on the transverse pins 21, one set of which may be made of wood so that in the event of any foreign material such as stone or a slug of iron getting between the crushing screw and the concave, the wooden pin will break and thereby prevent injury to the grinding mill. The concave 18 is semi-cylindrical in shape and is located eccentrically with respect to the center of the shaft 14. Located on one side of the longitudinal center of the concave are a plurality of teeth 22 which are arranged in a series across the concave. These series of teeth are arranged at an angle of about 10° with respect to the transverse planes, which are at right angles with respect to the longitudinal axis of the machine. It will also be noted that these teeth are arranged at an angle in a direction away from the grinding mechanism so as to slightly retard the movement of the material toward the grinding mechanism by the action of the teeth on the rotary crushing member and conveyor screw hereinafter described.

Secured to the shaft 14 and co-operating with the teeth 22 formed on one side of the concave is a rotary crushing and conveying member generally referred to by the reference character 23. This crushing member is preferably made in two sections as shown at 24 and 25, which are interlocked with each other and secured to the shaft by any well known means. Formed integrally with each of the sections 24 and 25 are a plurality of spirally arranged peripheral teeth 26 which co-operate with the teeth 22 of the concave in breaking up the ears of corn as they are fed into the machine. Mounted on the base frame member 10 on the side opposite the teeth 22 is a breaker bar 27 which is secured to the main frame 10 by means of bolts 28. The breaker bar is provided with a plurality of inwardly projecting teeth 29 forming tooth-shaped recesses 30 therebetween and through which the teeth 26 of the conveyor or crushing screw 23 are adapted to pass for further crushing the particles of the ears of corn. The section 25 of the conveyor screw is provided with a relatively short spiral rib as shown at 31 which is positioned adjacent the bearing 12 for the purpose of keeping the material away from the bearing. The forward end of section 24 of the crushing member is provided with a spirally arranged relatively short feeding rib 32. This rib is for the purpose of feeding the material into the grinding burrs (not shown) mounted in the burr casing 33.

It will be noted by referring to Figure 2 that by reason of the eccentric position of the concave and particularly the teeth thereof with respect to the longitudinal axis of the conveyor or crushing member, that as the ear of corn is fed between the co-operative teeth of each of these members it is gradually and successively broken up into smaller particles by reason of the fact that as the corn is progressively moved between the concave and the crushing member the space between the cooperative teeth of each of these members approach each other at a relatively closer position.

In the operation of my improved grinding machine it will be noted that as the shaft 14 is rotated by the power applied to the belt pulley 15 so that the same rotates in the direction indicated by the arrow in Figure 1, the ears of corn in a hopper adjacent the crushing member will immediately assume a position parallel to the shaft. When the ear of corn reaches this position one of the teeth 26 formed on the crushing member will engage a portion of the ear and with the cooperative action of the teeth on the concave, will grip the ear and retard its movement in a direction toward the grinding mechanism. This construction permits each successive tooth of the crushing member to engage its portion of the ear, thus tearing and breaking up the ear of corn by successive action of the teeth during each cycle of operation of the machine so that a smoothly running and efficiently operated machine is produced. It will also be noted that should some of the particles of the ears of corn be not sufficiently broken up they will be conveyed by the teeth 26 of the crushing member to the opposite side of the concave where they will be broken up between the teeth 29 of the breaker bar 27 and the teeth 26 of the crushing member.

From the above specification it will be seen that I have provided a very simple and efficient conveying and crushing mechanism for a grinding mill which not only permits a smooth and continuous operation of the machine but also increases the capacity of the mill by reason of reducing the burden of passing large particles to the grinding mechanism of the mill.

While in the above specification I have shown one embodiment which my invention may assume in practice, it will of course be understood that the same is capable of modification and that modification may be made without departing from the spirit and scope of the present invention as described in the following claims.

What I claim as my invention and desire to secure by Letters Patent is:

1. In a grinding mill, a device for crushing material comprising a frame, a grinding mechanism mounted on one end of said frame, a rotary crushing member mounted on said frame, a plurality of spirally arranged peripheral teeth formed on said rotary member for crushing and conveying material, a concave mounted on said frame and a plurality of teeth carried by said concave and arranged in position to retard the conveying action of the teeth on said rotary member toward said grinding mechanism.

2. In a grinding mill, a rotary crushing member mounted on said frame, a grinding mechanism mounted on one end of said frame, a plurality of spirally arranged peripheral teeth carried by said rotary member for crushing and conveying material, a concave mounted on said frame and a plurality of angularly arranged teeth mounted in said concave and extending in a direction away from said grinding mechanism for retarding the movement of the material toward said grinding mechanism.

3. In a grinding mill, a device for crushing material comprising a frame, a rotary crushing member mounted on said frame, a plurality of spirally arranged peripheral teeth carried by said rotary member for crushing and conveying material, a concave mounted on said frame and a plurality of angularly arranged sets of teeth mounted on one side of said concave co-operating with the teeth on said rotary member for crushing the material passing therebetween and for retarding the movement of the material in one direction.

4. In a grinding mill, a device for crushing material comprising a frame, a rotary crushing and conveying member mounted on said frame, a plurality of spirally arranged peripheral teeth carried by said rotary member, a concave secured to said frame and a plurality of teeth carried by said concave occupying a position at an angle reverse to the angle on the teeth on said rotary member for retarding the feeding action of said rotary member.

5. In a grinding mill, a device for crushing material comprising a frame, a grinding mechanism mounted on one end of said frame, a concave secured to said frame, a plurality of teeth carried by said concave and arranged at an angle in a direction away from said grinding mechanism, a rotary crushing and conveying member journalled in said frame and mounted eccentrically with respect to the axis of said concave and a plurality of spirally arranged peripheral teeth formed on said rotary member and co-operating with the teeth on said concave whereby the teeth on said rotary member are successively brought into co-operative relation with the teeth on said concave for crushing the material therebetween.

6. In a grinding mill, a device for crushing material comprising a frame, a grinding mechanism mounted on one end of said frame a concave secured to said frame, a plurality of teeth formed on said concave and arranged in an angularly aligned direction away from said grinding mechanism, a rotary crushing and conveying member journalled in said frame and located eccentrically with respect to said concave, and a plurality of spirally arranged peripheral teeth formed on said rotary member for crushing and breaking up the material between the teeth of said concave and for conveying the material toward said grinding mechanism.

7. In a grinding mill, a device for crushing material comprising a frame, a grinding mechanism mounted on one end of said frame, a concave secured to said frame, a plurality of teeth formed on said concave and arranged in angular alignment in a direction away from said grinding mechanism, a rotary crushing and conveying member journalled in said frame and located eccentrically with respect to said concave, a plurality of spirally arranged peripheral teeth formed on said rotary member for crushing and breaking up the material between the teeth of said concave and for conveying the material toward said grinding mechanism, and a plurality of breaker teeth carried by said frame and co-operating with the teeth on said rotary member for further reducing the material passing therebetween.

8. In a grinding mill, a device for crushing material comprising a frame, a grinding mechanism mounted on one end of said frame, a concave secured to said frame, a plurality of teeth formed on said concave and arranged in angular alignment in a direction away from said grinding mechanism, a rotary crushing and conveying member journalled in said frame and located eccentrically with respect to said concave, a plurality of spirally arranged peripheral teeth formed on said rotary member for crushing and breaking up the material between the teeth of said concave and for conveying the material toward said grinding mechanism, and a plurality of inwardly projecting teeth mounted on said frame in a horizontal plane co-operating with the spiral teeth on said rotary member for further reducing the material passing therebetween.

9. In a grinding mill, a device for crushing material comprising a frame, a rotary crushing member mounted on said frame and having a plurality of spirally arranged peripheral teeth thereon, a concave member mounted on said frame and having a plurality of teeth co-operating with the teeth on said rotary member for grasping and crushing the material passing therebetween and a breaker bar carried on one side of said frame and having inwardly projecting teeth co-operating with the teeth on said rotary member for reducing the material passing therebetween.

10. In a grinding mill, a rotary crushing member mounted on said frame, a plurality of spirally arranged peripheral teeth carried by said rotary member for crushing and conveying material, a concave mounted on said frame and positioned eccentrically with respect to the axis of said rotary member, a plurality of teeth carried by said concave and occupying an arcuate position eccentrically to the axis of said rotary member and a breaker bar carried by said frame and co-operating with said rotary member for reducing the material passing therebetween.

11. In a grinding mill, a device for crushing material comprising a frame, a rotary crushing member mounted on said frame, a plurality of spirally arranged peripheral teeth carried by said rotary member for crushing and conveying material, a concave mounted on said frame and positioned eccentrically with respect to said rotary member, a plurality of angularly arranged sets of teeth mounted on one side of said concave and occupying an arcuate position eccentric to the axis of said rotary member whereby the material passing between said concave and said rotary member is crushed and conveyed thereby and a breaker bar carried by said frame occupying a horizontal position with respect thereto and co-operating with said rotary member for reducing the material passing therebetween.

12. In a grinding mill, a device for crushing material comprising a frame, a concave secured to said frame, a plurality of angularly arranged teeth carried by said concave, a rotary crushing and conveying member journaled on said frame above said concave, a plurality of spirally arranged peripheral teeth carried by said rotary member and occupying an angular position reversed to that of the teeth on said concave whereby the teeth on said rotary member will successively be brought into co-operative relation with the teeth on said concave for crushing the material therebetween and a breaker bar carried by said frame co-operating with said rotary member for further reducing the material passing therebetween.

In testimony whereof I have signed my name to this specification, on this 18th day of April, A. D. 1927.

JOHN C. BOHMKER.